United States Patent
Okido et al.

(10) Patent No.: US 9,725,630 B2
(45) Date of Patent: Aug. 8, 2017

(54) WORKING FLUID COMPOSITION FOR REFRIGERATOR

(71) Applicant: JX NIPPON OIL & ENERGY CORPORATION, Tokyo (JP)

(72) Inventors: Takeshi Okido, Tokyo (JP); Souichirou Konno, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 14 days.

(21) Appl. No.: 14/777,583

(22) PCT Filed: Mar. 14, 2014

(86) PCT No.: PCT/JP2014/056971
§ 371 (c)(1),
(2) Date: Sep. 16, 2015

(87) PCT Pub. No.: WO2014/156738
PCT Pub. Date: Oct. 2, 2014

(65) Prior Publication Data
US 2016/0289523 A1 Oct. 6, 2016

(30) Foreign Application Priority Data
Mar. 25, 2013 (JP) .................. 2013-062530

(51) Int. Cl.
*C09K 5/04* (2006.01)
*C10M 105/32* (2006.01)

(52) U.S. Cl.
CPC ............. *C09K 5/041* (2013.01); *C09K 5/042* (2013.01); *C10M 105/32* (2013.01); *C10M 2207/2835* (2013.01); *C10M 2207/301* (2013.01); *C10M 2207/3025* (2013.01); *C10M 2207/3045* (2013.01); *C10N 2220/022* (2013.01); *C10N 2220/028* (2013.01); *C10N 2230/06* (2013.01); *C10N 2240/30* (2013.01)

(58) Field of Classification Search
CPC .. C10M 2207/31; C10M 105/42; C09K 5/042
See application file for complete search history.

(56) References Cited

U.S. PATENT DOCUMENTS

| 5,185,092 A | 2/1993 | Fukuda et al. |
| 5,750,750 A | 5/1998 | Duncan et al. |
| 5,820,777 A | 10/1998 | Schnur et al. |
| 5,922,658 A | 7/1999 | Duncan et al. |
| 2010/0038583 A1* | 2/2010 | Shimomura ........... C09K 5/044 252/68 |
| 2010/0117022 A1 | 5/2010 | Carr et al. |
| 2011/0079749 A1* | 4/2011 | Carr .................... C10M 105/42 252/68 |
| 2012/0184474 A1 | 7/2012 | Kawata et al. |

FOREIGN PATENT DOCUMENTS

| CN | 1231687 | 10/1999 |
| CN | 102216438 | 10/2011 |
| EP | 0 571 091 A1 | 11/1993 |
| EP | 2 930 228 A1 | 10/2015 |
| JP | 3-252497 | 11/1991 |
| JP | 7-507346 | 8/1995 |
| JP | 2012-508807 | 4/2012 |
| JP | 2012-102235 | 5/2012 |
| WO | 93/24587 A1 | 12/1993 |
| WO | 2013-129566 | 9/2013 |

OTHER PUBLICATIONS

Chinese Office Action issued with respect to Application No. 201480009253.3, mail date is Aug. 31, 2016.
International Search Report issued in PCT/JP2014/056971, dated Jun. 17, 2014.
Translation of the International Preliminary Report on Patentability issued in PCT/JP2014/056971, dated Oct. 8, 2015.
European Search Report issued with respect to Application No. 14776353.6, mail date is May 13, 2016.
Taiwanese Office Action in respect to Taiwanese Application No. 103110757, dated Apr. 26, 2017.

* cited by examiner

*Primary Examiner* — John Hardee
(74) *Attorney, Agent, or Firm* — Greenblum & Bernstein, P.L.C.

(57) ABSTRACT

The present invention provides a working fluid composition for a refrigerating machine, comprising: a refrigerating machine oil comprising, as a base oil, a mixed ester of (A) a complex ester obtainable by synthesis of at least one polyhydric alcohol selected from neopentyl glycol, trimethylolpropane and pentaerythritol, a C6-C12 polybasic acid, and a C4-C18 monohydric alcohol or a C4-C18 monocarboxylic fatty acid, and (B) a polyol ester obtainable by synthesis of at least one polyhydric alcohol selected from neopentyl glycol, trimethylolpropane, pentaerythritol and dipentaerythritol, and a C4-C18 monocarboxylic fatty acid, in a mass ratio of (A) the complex ester/(B) the polyol ester of 5/95 to 95/5; and a hydrocarbon refrigerant having 3 or 4 carbon atoms, wherein a refrigerant dissolved viscosity, at a temperature of 80° C. and an absolute pressure of 1.5 MPa, is 1.0 mm$^2$/s or more.

7 Claims, No Drawings

WORKING FLUID COMPOSITION FOR REFRIGERATOR

TECHNICAL FIELD

The present invention relates to a working fluid composition for a refrigerating machine. It is noted that the term "refrigerating machine" herein embraces a vehicle air conditioner, a dehumidifier, a refrigerator, a refrigerated warehouse, a cooling apparatus used in a vending machine, a showcase, a chemical plant or the like, a household air conditioner, a package air conditioner, a heat pump for hot water supply, and the like.

BACKGROUND ART

In the field of refrigeration and air conditioning, 1,1,1,2-tetrafluoroethane (R134a) that is a hydrofluorocarbon (HFC) and R410A that is a mixed refrigerant of difluoromethane (R32) and pentafluoroethane (R125) in a mass ratio of 1/1 are currently widely used as refrigerants for a refrigerator, a car air conditioner, a room air conditioner, industrial refrigerating machine, and the like. Although such HFC refrigerants have an ozone depletion potential (ODP) of zero, they have a high global warming potential (GWP) of 1000 or more, and therefore, their usage is limited in accordance with what is called the F-gas regulations aiming at the global environmental protection.

A hydrocarbon refrigerant, such as isobutane (R600a) and propane (R290), practically used for a refrigerator has such a suitable physical property value as a GWP as low as 20 or lower, and hence is being examined as an alternative refrigerant although it is combustible.

Differently from an HFC refrigerant and the like, a hydrocarbon refrigerant cannot be expected to show an effect of improving lubricity by the refrigerant because it does not contain, in a hydrocarbon molecule, fluorine improving the lubricity, and in addition, the hydrocarbon refrigerant has high solubility in a refrigerating machine oil and hence lowers the viscosity of the oil, namely, the thickness of an oil film is reduced, which makes a lubrication condition severer, and accordingly, a working fluid for refrigeration and air conditioning in which a refrigerating machine oil and a refrigerant are blended is required to have higher antiwear property than conventionally required.

With respect to a base oil for a general industrial lubricating oil, Patent Literature 1 proposes a lubricating oil base oil containing a synthetic ester obtained by reacting an alcohol component containing 90% by mass or more of trimethylolpropane with a carboxylic acid component that contains a monocarboxylic fatty acid having 8 to 12 carbon atoms and adipic acid, and further contains, in a total amount of 90% by mass or more, caprylic acid and/or a monocarboxylic fatty acid having 8 to 12 carbon atoms containing 90% by mass or more of caprylic acid in total, and adipic acid.

CITATION LIST

Patent Literature

Patent Literature 1: Japanese Patent Application Laid-Open No. 2012-102235

SUMMARY OF INVENTION

Technical Problem

There is a trend, however, that a load condition in a sliding portion of a refrigerating machine becomes more severe in the future, and therefore, there is a demand for a working fluid showing excellent antiwear property in a case where a hydrocarbon refrigerant coexists and is dissolved in a refrigerating machine oil.

The present invention was accomplished in consideration of the above-described problem, and an object is to provide a working fluid composition for a refrigerating machine that can retain a thick oil film and show a high antiwear effect and is good in long-term reliability even under a severe lubrication condition caused when a refrigerant coexists and is dissolved in a refrigerating machine oil.

Solution to Problem

The present inventors have discovered that a working fluid for refrigeration/air conditioning, which comprises a refrigerating machine oil using, as a base oil, an ester containing a complex ester obtainable by synthesis of specific polyhydric alcohol, polybasic acid, monohydric alcohol or monocarboxylic fatty acid, and a polyol ester obtainable by synthesis of specific polyhydric alcohol and monocarboxylic fatty acid; and a hydrocarbon refrigerant used as a refrigerant, and has a high refrigerant dissolved viscosity under a specific condition, forms a thick oil film to show high antiwear property, resulting in accomplishing the present invention.

Specifically, the present invention provides a working fluid composition for a refrigerating machine according to the following [1] to [6]:

[1] A working fluid composition for a refrigerating machine, comprising: a refrigerating machine oil comprising, as a base oil, a mixed ester of (A) a complex ester obtainable by synthesis of at least one polyhydric alcohol selected from neopentyl glycol, trimethylolpropane and pentaerythritol, a C6-C12 polybasic acid, and a C4-C18 monohydric alcohol or a C4-C18 monocarboxylic fatty acid, and (B) a polyol ester obtainable by synthesis of at least one polyhydric alcohol selected from neopentyl glycol, trimethylolpropane, pentaerythritol and dipentaerythritol, and a C4-C18 monocarboxylic fatty acid, in a mass ratio of (A) the complex ester/(B) the polyol ester of 5/95 to 95/5; and a hydrocarbon refrigerant having 3 or 4 carbon atoms, wherein a refrigerant dissolved viscosity, at a temperature of 80° C. and an absolute pressure of 1.5 MPa, is 1.0 $mm^2$/s or more.

[2] The working fluid composition for a refrigerating machine according to [1], wherein the polyhydric alcohol constituting (A) the complex ester is neopentyl glycol and/or trimethylolpropane.

[3] The working fluid composition for a refrigerating machine according to [1] or [2], wherein the polybasic acid constituting (A) the complex ester is adipic acid and/or sebacic acid.

[4] The working fluid composition for a refrigerating machine according to any one of [1] to [3], wherein the monohydric alcohol constituting (A) the complex ester is a C8-C10 alcohol.

[5] The working fluid composition for a refrigerating machine according to any one of [1] to [4], wherein (B) the polyol ester is an ester obtainable by synthesis of neopentyl glycol and/or pentaerythritol and a C4-C9 monocarboxylic fatty acid.

[6] The working fluid composition for a refrigerating machine according to any one of [1] to [5], wherein (B) the polyol ester is an ester obtainable by synthesis of pentaerythritol and any one of a mixed acid of a C4 monocarboxylic fatty acid and 3,5,5-trimethylhexanoic acid, a mixed acid of a C5 monocarboxylic fatty acid and 3,5,5-trimethylhexanoic acid, and a mixed acid of a C4 monocarboxylic fatty acid, a C5 monocarboxylic fatty acid and 3,5,5-trimethylhexanoic acid.

Advantageous Effects of Invention

A working fluid composition for a refrigerating machine of the present invention has, even under a severe lubrication condition in which the viscosity of a refrigerating machine oil is lowered because a hydrocarbon refrigerant is dissolved therein, high antiwear property and excellent stability, and exhibits a remarkable effect that an apparatus can be used stably over a long period of time.

DESCRIPTION OF EMBODIMENTS

A preferred embodiment of the present invention will now be described in detail.

A working fluid composition for a refrigerating machine according to the embodiment of the present invention comprises: a refrigerating machine oil comprising, as a base oil, a mixed ester of (A) a complex ester obtainable by synthesis of at least one polyhydric alcohol selected from neopentyl glycol, trimethylolpropane and pentaerythritol, a C6-C12 polybasic acid (a polybasic acid having 6 to 12 carbon atoms), and a C4-C18 monohydric alcohol (a monohydric alcohol having 4 to 18 carbon atoms), or a C4-C18 monocarboxylic fatty acid (a monocarboxylic fatty acid having 4 to 18 carbon atoms), and (B) a polyol ester obtainable by synthesis of at least one polyhydric alcohol selected from neopentyl glycol, trimethylolpropane, pentaerythritol and dipentaerythritol, and a C4-C18 monocarboxylic fatty acid (a monocarboxylic fatty acid having 4 to 18 carbon atoms), in a mass ratio of (A) the complex ester/(B) the polyol ester of 5/95 to 95/5; and a hydrocarbon refrigerant having 3 or 4 carbon atoms, wherein a refrigerant dissolved viscosity, at a temperature of 80° C. and an absolute pressure of 1.5 MPa, is 1.0 $mm^2/s$ or more.

The aforementioned complex ester has a lower compatibility with a refrigerant because the refrigerant is difficult to dissolve therein as compared with a conventional refrigerating machine oil, but has a characteristic that it can retain an oil film thick. Besides, the aforementioned polyol ester is good in the compatibility with a refrigerant. In the present embodiment, since the complex ester and the polyol ester thus having different characteristics (of, particularly, a refrigerant solubility) are blended, the oil film can be made thick in coexistence of a refrigerant, and accordingly, the antiwear property of a resultant working fluid can be improved.

Incidentally, a complex ester is difficult to be compatible with a refrigerant because it has a high molecular weight and hence is an ester with a high viscosity, and it is not suitably used singly as a base oil of a refrigerating machine oil requiring compatibility with a refrigerant from the viewpoint of oil return to a compressor. As one characteristic of the present embodiment, it is possible to make the characteristics balanced by mixing the complex ester with an oil having a good compatibility with a refrigerant, such as the above-described polyol ester.

A preferable kinematic viscosity of the complex ester is 20 to 500 $mm^2/s$ at 40° C., a more preferable viscosity is 40 to 400 $mm^2/s$, and a further preferable viscosity is 50 to 300 $mm^2/s$. Besides, the viscosity index is preferably 100 or more, and particularly preferably 110 to 160.

Examples of a synthesizing method for the complex ester include:

(a) a method in which a molar ratio between a polyhydric alcohol and a polybasic acid is adjusted for obtaining an ester intermediate having a carboxyl group of the polybasic acid remaining therein, and the carboxyl group is esterified by a monohydric alcohol; and (b) a method in which a molar ratio between a polyhydric alcohol and a polybasic acid is adjusted for obtaining an ester intermediate having a hydroxyl group of the polyhydric alcohol remaining therein, and the hydroxyl group is esterified by a monocarboxylic fatty acid.

A complex ester obtained by the method of (b) above is rather inferior in stability to a complex ester obtained by the method of (a) above because a comparatively strong acid is produced if the former is hydrolyzed when used as a refrigerating machine oil. The complex ester of the present embodiment is preferably a complex ester with higher stability obtained by the method of (a) above.

The polyhydric alcohol constituting the complex ester is preferably neopentyl glycol or trimethylolpropane for attaining a suitable viscosity as a base oil. Incidentally, if tetravalent pentaerythritol is used, as compared with a case of using neopentyl glycol or trimethylolpropane, the viscosity of a resultant complex ester tends to be higher and a low temperature characteristic also tends to be poorer. Besides, neopentyl glycol whose viscosity can be widely adjusted is more preferred.

Besides, the polyhydric alcohol constituting the complex ester preferably further contains, in addition to at least one selected from neopentyl glycol, trimethylolpropane and pentaerythritol, a C2-C10 dihydric alcohol (a dihydric alcohol having 2 to 10 carbon atoms) except neopentyl glycol because thus the lubricity can be improved. Examples of the dihydric alcohol having 2 to 10 carbon atoms except neopentyl glycol include ethylene glycol, propanediol, butanediol, pentanediol, hexanediol, 2-methyl-1,3-propanediol, 3-methyl-1,5-pentanediol and 2,2-diethyl-1,3-pentanediol, and butanediol that can attain good characteristic balance of a resultant synthesized base oil is preferred, and examples of the butanediol include 1,2-butanediol, 1,3-butanediol, 1,4-butanediol and 2,3-butanediol, among which 1,3-butanediol and 1,4-butandiol are more preferred from the viewpoint of characteristics. The dihydric alcohol having 2 to 10 carbon atoms except neopentyl glycol is used in an amount of preferably 1.2 mol or less, particularly preferably 0.8 mol or less, and further preferably 0.4 mol or less based on 1 mol of the polyhydric alcohol selected from neopentyl glycol, trimethylolpropane and pentaerythritol.

The polybasic acid constituting the complex ester is a polybasic acid having 6 to 12 carbon atoms. Examples of such a polybasic acid include adipic acid, pimelic acid, suberic acid, azelaic acid, sebacic acid, phthalic acid and trimellitic acid, among which adipic acid and sebacic acid that are good in the characteristic balance of a resultant synthesized ester and in availability are preferred, and in particular, adipic acid is more preferred. The polybasic acid is used in an amount of preferably 0.4 to 4 mol, particularly preferably 0.5 mol to 3 mol, and further preferably 0.6 mol to 2.5 mol based on 1 mol of the polyhydric alcohol selected from neopentyl glycol, trimethylolpropane and pentaerythritol.

If a carboxyl group remains in a complex ester intermediate produced through the reaction between the polyhydric alcohol and the polybasic acid, the carboxyl group is esterified by a monohydric alcohol having 4 to 18 carbon atoms. Examples of the monohydric alcohol having 4 to 18 carbon atoms include straight or branched butanol, straight or branched pentanol, straight or branched hexanol, straight or branched heptanol, straight or branched octanol, straight or branched nonanol, straight or branched decanol, straight or branched dodecanol, and an aliphatic alcohol such as oleyl alcohol. From the viewpoint of the characteristic balance, monohydric alcohols having 6 to 10 carbon atoms, and 8 to 10 carbon atoms in particular are preferred, among which 2-ethyihexanol and 3,5,5-trimethylhexanol are preferred from the viewpoint of a good low temperature characteristic of the synthesized complex ester.

Alternatively, if a hydroxyl group remains in the complex ester intermediate produced through the reaction between the polyhydric alcohol and the polybasic acid, the hydroxyl group is esterified by a monocarboxylic fatty acid having 4 to 18 carbon atoms. Examples of the monocarboxylic fatty acid having 4 to 18 carbon atoms include straight or branched butanoic acid, straight or branched pentanoic acid, straight or branched hexanoic acid, straight or branched heptanoic acid, straight or branched octanoic acid, straight or branched nonanoic acid, straight or branched decanoic acid, straight or branched dodecanoic acid, and oleic acid. Preferably, C8-C10 monocarboxylic fatty acids (monocarboxylic fatty acids having 8 to 10 carbon atoms) are used, among which 2-ethylhexanoic acid and 3,5,5-trimethylhexanoic acid are preferred from the viewpoint of the low temperature characteristic.

On the other hand, the polyol ester of the present embodiment is a polyol ester that can be synthesized from at least one polyhydric alcohol selected from neopentyl glycol, trimethylolpropane, pentaerythritol and dipentaerythritol, and a monocarboxylic fatty acid having 4 to 18 carbon atoms.

As the polyhydric alcohol constituting the polyol ester, trimethylolpropane and pentaerythritol are preferred, and pentaerythritol is more preferred from the viewpoint of the characteristic balance.

Examples of the monocarboxylic fatty acid having 4 to 18 carbon atoms constituting the polyol ester include straight or branched butanoic acid, straight or branched pentanoic acid, straight or branched hexanoic acid, straight or branched heptanoic acid, straight or branched octanoic acid, straight or branched nonanoic acid, straight or branched decanoic acid, straight or branched dodecanoic acid, and oleic acid. From the viewpoint of the low temperature characteristic, a monocarboxylic fatty acid having 4 to 9 carbon atoms is preferred, and branched butanoic acid, branched pentanoic acid, branched hexanoic acid, branched heptanoic acid, 2-ethylhexanoic acid and 3,5,5-trimethylhexanoic acid are more preferred. Particularly, a saturated monocarboxylic fatty acid having 4 or 5 carbon atoms is preferred.

From the viewpoint of the compatibility with a refrigerant, a polyol ester obtainable by synthesis of a pentaerythritol used as the polyhydric alcohol and a mixed acid of branched fatty acid having 4 to 9 carbon atoms used as the monocarboxylic fatty acid is the most preferred.

In the working fluid composition for a refrigerating machine of the present embodiment, assuming that the content of the complex ester is (A) and the content of the polyol ester is (B), the ratio (A)/(B) in a mass ratio is 5/95 to 95/5, and preferably 50/50 to 95/5 from the viewpoint of lubricity for taking more advantages of the characteristics of the respective esters, and preferably 50/50 to 5/95 from the viewpoint of the compatibility with a refrigerant.

The kinematic viscosity at 40° C. of the refrigerating machine oil of the present embodiment is preferably 3 to 500 mm$^2$/s, more preferably 8 to 150 mm$^2$/s, and further more preferably 20 to 100 mm$^2$/s. Besides, the viscosity index of the refrigerating machine oil is preferably 50 or more and particularly preferably 80 to 120.

The pour point of the refrigerating machine oil of the present embodiment is preferably −10° C. or less, and more preferably −20° C. or less.

The acid value of the refrigerating machine oil of the present embodiment can be preferably 0.1 mgKOH/g or less, and more preferably 0.05 mgKOH/g or less in order to prevent corrosion of a metal used in refrigerating machine or piping and to suppress degradation of the refrigerating machine oil itself. It is noted that the acid value herein means an acid value measured in accordance with JIS K2501 "determination method of acid value".

The flash point of the refrigerating machine oil of the present embodiment is preferably 120° C. or more, and more preferably 200° C. or more.

The moisture content of the refrigerating machine oil of the present embodiment is preferably 200 ppm or less, more preferably 100 ppm or less, and most preferably 50 ppm or less. In particular, if it is used in hermetic refrigerating machine, the moisture content is required to be small from the viewpoint of the stability and electric insulation of the refrigerating machine oil.

Besides, the refrigerating machine oil of the present embodiment may further contain, in addition to the complex ester and the polyol ester described above, another base oil such as a mineral base oil or a synthetic base oil. The total content of the above complex ester and the polyol ester is preferably 80% by mass or more, and particularly preferably 95% by mass or more of the refrigerating machine oil.

With respect to refrigerating machine, there is a trend that conventionally used HFC refrigerants having a high GWP are shifted to refrigerants having a low GWP from the viewpoint of the prevention of global warming as described above, and therefore, refrigerating machine oils suitable for such refrigerants are necessary, and a suitable working fluid of a mixture of a refrigerant and a refrigerating machine oil is demanded. According to the present invention, a hydrocarbon refrigerant having 3 or 4 carbon atoms is contained as a refrigerant, and the content of the hydrocarbon refrigerant having 3 or 4 carbon atoms in the refrigerant is preferably 60 to 100% by mass, and particularly preferably 80 to 100% by mass. Examples of the hydrocarbon refrigerant having 3 or 4 carbon atoms include propane (R290) and isobutane (R600a).

The mixing ratio between the refrigerating machine oil composition and the refrigerant in the working fluid composition for a refrigerating machine of the present embodiment is not especially limited, and the amount of the refrigerating machine oil composition is preferably 1 to 500 parts by mass, and more preferably 2 to 400 parts by mass based on 100 parts by mass of the refrigerant.

The refrigerant-dissolved viscosity, at a temperature of 80° C. and an absolute pressure of 1.5 MPa, of the working fluid composition for a refrigerating machine of the present embodiment is 1.0 mm$^2$/s or more, preferably 1.5 mm$^2$/s or more, and usually 10.0 mm$^2$/s or less.

The working fluid composition of the present embodiment can further contain various additives for further improving the antiwear property. A suitable example of the additives includes a phosphate, and particularly preferable compounds are triphenyl phosphate (TPP) and tricresyl phosphate (TCP).

Besides, suitable examples of a sulfur additive include sulfides, and there are a large number of sulfide compounds, among which a monosulfide compound is preferred. This is because, for example, a highly active sulfur compound such as a disulfide compound degrades the stability of a refrigerating machine oil and changes the quality of copper often used within refrigerating machine.

The working fluid composition for a refrigerating machine of the present embodiment can contain, in addition to the aforementioned additives, additives conventionally used in a lubricating oil, such as an antioxidant, a friction modifier, an antiwear agent, an extreme pressure agent, a rust inhibitor, a metal deactivator and an antifoaming agent, in a range not impairing the object of the present invention, for further improving the performance.

As the antioxidant, a phenol-based compound such as di-tert-butyl-p-cresol, an amine-based compound such as alkyldiphenylamine, or the like can be contained. In particular, it is preferable to contain a phenol-based compound antioxidant in an amount of 0.02 to 0.5% by mass based on the total amount of the refrigerating machine oil.

Examples of the friction modifier include aliphatic amines, aliphatic amides, aliphatic imides, alcohols, esters, acid phosphate amine salts and phosphite amine salts, an example of the anti-wear agent includes zinc dialkyldithiophosphate, examples of the extreme pressure agent include olefin sulfide and sulfurized fats and oils, examples of the rust inhibitor include alkenyl succinic esters or partial esters, examples of the metal deactivator include benzotriazole and benzotriazole derivatives, and examples of the antifoaming agent include silicone compounds and polyester compounds.

EXAMPLES

The present invention will now be described more specifically on the basis of Examples and Comparative Examples, and it is noted that the present invention is not limited to the following Examples at all.

Examples 1 to 8 and Comparative Examples 1 to 3

In Examples 1 to 8 and Comparative Examples 1 to 3, base oils having compositions shown in Tables 1 to 2 were first prepared by using the following base materials.

[A] Complex Esters (A-1) An ester (having a kinematic viscosity at 40° C. of 67.8 mm$^2$/s and a viscosity index of 145) obtained by reacting an ester intermediate resulting from a reaction of neopentyl glycol (1 mol) and 1,4-butanediol (0.3 mol) with adipic acid (2.4 mol) further with 3,5,5-trimethylhexanol (2.5 mol), and distilling off a remaining unreacted substance.

(A-2) An ester (having a kinematic viscosity at 40° C. of 77.3 mm$^2$/s and a viscosity index of 148) obtained by causing an ester intermediate resulting from a reaction of trimethylolpropane (1 mol) and 1,3-butanediol (0.2 mol) with sebacic acid (2.4 mol) to further react with normal heptanol (1.6 mol) and distilling off a remaining unreacted substance.

(A-3) An ester (having a kinematic viscosity at 40° C. of 68.8 mm$^2$/s and a viscosity index of 120) obtained by causing an ester intermediate resulting from a reaction of trimethylolpropane (1 mol) with adipic acid (2.4 mol) to further react with 2-ethylhexanol (2.0 mol) and distilling off a remaining unreacted substance.

(A-4) An ester (having a kinematic viscosity at 40° C. of 71.5 mm$^2$/s and a viscosity index of 114) obtained by causing an ester intermediate resulting from a reaction of neopentyl glycol (1 mol) with adipic acid (0.8 mol) to further react with 3,5,5-trimethylhexanoic acid (0.5 mol) and distilling off a remaining unreacted substance.

[B] Polyol Esters (B-1) An ester (having a kinematic viscosity at 40° C. of 69.4 mm$^2$/s and a viscosity index of 95) of pentaerythritol and a mixed acid of 2-methyl propanoic acid and 3,5,5-trimethylhexanoic acid in a molar ratio of 35:65.

(B-2) An ester (having a kinematic viscosity at 40° C. of 70.1 mm$^2$/s and a viscosity index of 90) of pentaerythritol and a mixed acid of 2-ethylhexanoic acid and 3,5,5-trimethylhexanoic acid in a molar ratio of 45:55.

(B-3) An ester (having a kinematic viscosity at 40° C. of 8.3 mm$^2$/s and a viscosity index of 56) of neopentyl glycol and 2-ethylhexanoic acid.

(B-4) An ester (having a kinematic viscosity at 40° C. of 53.8 mm$^2$/s and a viscosity index of 99) of pentaerythritol and a mixed acid of pentanoic acid and 3,5,5-trimethylhexanoic acid in a molar ratio of 40:60.

In these base oils, synthesis reactions of the esters of [A] and [B] are performed without using a catalyst and a solvent, and a slight amount of impurities was removed by an adsorption treatment (a clay treatment) in the final process. Incidentally, the kinematic viscosity and the viscosity index were measured and calculated in accordance with JIS K2283.

Next, a refrigerating machine oil was prepared by mixing di-tert-butyl-p-cresol (DBPC) serving as an antioxidant in an amount of 0.1% by mass with each of the base oils of Examples 1 to 8 and Comparative Examples 1 to 3.

The refrigerating machine oils of Examples 1 to 8 and Comparative Examples 1 to 3 were subjected to measurement of dissolved viscosity as follows.

(Measurement of Refrigerant Dissolved Viscosity)

A 200 ml pressure resistant vessel in which a vibration type viscometer was put was charged with 100 g of each of the refrigerating machine oils, and after vacuum degassing the vessel, a working fluid composition was prepared by adding an propane refrigerant thereto, and the viscosity was measured with the pressure of the refrigerant and the temperature of the pressure resistant vessel adjusted to conditions of a temperature of 80° C. and an absolute pressure of 1.5 MPa. The obtained results are shown in Tables 1 to 2.

TABLE 1

|  | Example 1 | Example 2 | Example 3 | Example 4 | Example 5 | Example 6 | Example 7 | Example 8 |
|---|---|---|---|---|---|---|---|---|
| Composition of base oil (mass %) | | | | | | | | |
| A-1 | 50 | — | — | — | 40 | 20 | — | — |
| A-2 | — | 40 | — | — | — | — | 60 | — |
| A-3 | — | — | 30 | — | — | — | — | 60 |
| A-4 | — | — | — | 80 | — | — | — | — |
| B-1 | 50 | 60 | 70 | 20 | — | — | — | — |
| B-2 | — | — | — | — | 60 | — | 40 | — |

TABLE 1-continued

|  | Example 1 | Example 2 | Example 3 | Example 4 | Example 5 | Example 6 | Example 7 | Example 8 |
|---|---|---|---|---|---|---|---|---|
| B-3 | — | — | — | — | — | — | — | 40 |
| B-4 | — | — | — | — | — | 80 | — | — |
| Kinematic viscosity at 40° C. (mm$^2$/s) | 68.6 | 72.4 | 69.2 | 71.1 | 69.2 | 55.1 | 74.3 | 25.4 |
| Refrigerant dissolved viscosity (mm$^2$/s) | 1.5 | 1.3 | 1.2 | 1.4 | 1.5 | 1.6 | 1.6 | 1.3 |

TABLE 2

|  | Comparative Example 1 | Comparative Example 2 | Comparative Example 3 |
|---|---|---|---|
| Composition of base oil (mass %) | | | |
| A-1 | — | — | — |
| A-2 | — | — | — |
| A-3 | — | — | — |
| A-4 | — | — | — |
| B-1 | 100 | — | — |
| B-2 | — | 100 | — |
| B-3 | — | — | 100 |
| B-4 | — | — | — |
| Kinematic viscosity at 40° C. (mm$^2$/s) | 69.4 | 70.1 | 83 |
| Refrigerant dissolved Viscosity (mm$^2$/s) | 0.7 | 0.8 | 0.6 |

It is understood that the working fluid compositions of Examples 1 to 8 have high refrigerant dissolved viscosities.

Besides, each of the refrigerating machine oils of Examples 1 to 8 is verified to have good lubricity (antiwear property) by the following lubricity test:

(Lubricity Test)

Test machine: high pressure ambience friction and wear tester (employing a rotating/sliding method using a rotating vane member and a fixed disk member) manufactured by Shinko Engineering Co., Ltd.

Oil amount: 600 ml
Test temperature: 110° C.
Rotation speed: 500 rpm
Applied load: 80 kgf
Test time: 1 hour
Vane member: SKH-51
Disk member: FC250
Refrigerant: n-hexane (contained in the refrigerating machine oil by 20% in terms of volume. This refrigerant was used as an alternative because a hydrocarbon refrigerant such as R290 had a problem in safety.)
Inside pressure of test vessel: slightly higher than normal pressure

INDUSTRIAL APPLICABILITY

A working fluid composition for a refrigerating machine of the present invention has a high viscosity when a hydrocarbon refrigerant is dissolved therein, and therefore exhibits a remarkable effect of greatly improving lubricity. Accordingly, it can be suitably used in a refrigeration/air conditioning system with high cooling efficiency including a compressor, a condenser, a throttle device, an evaporator and the like for circulating a refrigerant among these, in particular, in a system including a rotary type, swing type or scroll type compressor, and hence is useful in the fields of room air conditioners, package air conditions, refrigerating machines, vehicle air conditioners, industrial refrigerating machine and the like.

The invention claimed is:

1. A working fluid composition for a refrigerating machine, comprising:
a refrigerating machine oil comprising, as a base oil, a mixed ester of (A) a complex ester obtainable by synthesis of at least one polyhydric alcohol consisting of a first alcohol and optionally a second alcohol, wherein the first alcohol is selected from neopentyl glycol and trimethylolpropane, and the second alcohol is selected from C2-C10 dihydric alcohols except neopentyl glycol, a C6-C12 polybasic acid, and a C4-C18 monohydric alcohol or a C4-C18 monocarboxylic fatty acid, and (B) a polyol ester obtainable by synthesis of at least one polyhydric alcohol selected from neopentyl glycol, trimethylolpropane, pentaerythritol and dipentaerythritol, and a C4-C18 monocarboxylic fatty acid, in a mass ratio of (A) the complex ester/(B) the polyol ester of 5/95 to 95/5; and
a hydrocarbon refrigerant having 3 or 4 carbon atoms,
wherein a refrigerant dissolved viscosity, at a temperature of 80° C. and an absolute pressure of 1.5 MPa, is 1.0 mm$^2$/s or more.

2. The working fluid composition for a refrigerating machine according to claim 1, wherein the polyhydric alcohol constituting (A) the complex ester is neopentyl glycol and/or trimethylolpropane.

3. The working fluid composition for a refrigerating machine according to claim 1, wherein the polybasic acid constituting (A) the complex ester is adipic acid and/or sebacic acid.

4. The working fluid composition for a refrigerating machine according to claim 1, wherein the monohydric alcohol constituting (A) the complex ester is a C8-C10 alcohol.

5. The working fluid composition for a refrigerating machine according to claim 1, wherein (B) the polyol ester is an ester obtainable by synthesis of neopentyl glycol and/or pentaerythritol and a C4-C9 monocarboxylic fatty acid.

6. The working fluid composition for a refrigerating machine according to claim 1, wherein (B) the polyol ester is an ester obtainable by synthesis of pentaerythritol and any one of a mixed acid of a C4 monocarboxylic fatty acid and 3,5,5-trimethylhexanoic acid, a mixed acid of a C5 monocarboxylic fatty acid and 3,5,5-trimethylhexanoic acid, and a mixed acid of a C4 monocarboxylic fatty acid, a C5 monocarboxylic fatty acid and 3,5,5-trimethylhexanoic acid.

7. The working fluid composition for refrigerating machine according to claim 1, wherein (A) the complex ester is obtainable by synthesis of the polyhydric alcohol, the C6-C12 polybasic acid, and the C4-C18 monohydric alcohol.

\* \* \* \* \*